US012677968B2

(12) United States Patent
Wang

(10) Patent No.: US 12,677,968 B2
(45) Date of Patent: Jul. 14, 2026

(54) BIODEGRADABLE TEA LEAF STRAW AND METHOD FOR MAKING THE SAME

(71) Applicant: Hsien-Ming Wang, Tainan City (TW)

(72) Inventor: Hsien-Ming Wang, Tainan City (TW)

( * ) Notice: Subject to any disclaimer, the term of this patent is extended or adjusted under 35 U.S.C. 154(b) by 169 days.

(21) Appl. No.: 18/748,332

(22) Filed: Jun. 20, 2024

(65) Prior Publication Data

US 2025/0386962 A1 Dec. 25, 2025

(51) Int. Cl.
*B31D 5/00* (2017.01)
*A47G 21/18* (2006.01)

(52) U.S. Cl.
CPC ........... *A47G 21/18* (2013.01); *B31D 5/0095* (2013.01)

(58) Field of Classification Search
CPC ....... A47G 21/18; B29C 48/022; C08L 67/00; C08L 67/04
USPC .......................................................... 493/269
See application file for complete search history.

(56) References Cited

U.S. PATENT DOCUMENTS 5,578,338 A * 11/1996 Shimabukuro ........... A23F 3/34 426/456
2003/0185950 A1* 10/2003 Niino ...................... A23F 3/163 426/435
2018/0235159 A1* 8/2018 Chao ...................... A01G 13/33
2020/0015612 A1* 1/2020 Huang .................... B29C 48/09

FOREIGN PATENT DOCUMENTS

CN 111040398 A * 4/2020 .............. C08L 67/04

* cited by examiner

*Primary Examiner* — Jacob A Smith
(74) *Attorney, Agent, or Firm* — Workman Nydegger

(57) ABSTRACT

A biodegradable tea leaf straw suitable for use above room temperature and its manufacturing method. The straw includes a tubular body made from a composite. The composite includes the following raw materials by weight percentage: 35% to 65% of tea leaf mixture and 35% to 65% of biodegradable material. The tea leaf mixture contains tea leaf powder and inorganic filler powder. A particle size of the tea leaf powder is smaller than that of the inorganic filler powder. The tea leaf straw retains the natural aroma of tea leaves. All raw materials used in the manufacturing process can be quickly decomposed by environmental microorganisms. The tea leaf straw does not dissolve in the beverage, thereby not affecting its flavor during consumption. The tea leaf straw is feature can attract consumers to use these straws as an alternative to existing plastic straws.

3 Claims, 2 Drawing Sheets

BIODEGRADABLE TEA LEAF STRAW AND METHOD FOR MAKING THE SAME

FIELD OF THE INVENTION

The present invention relates to a tea leaf straw that is biodegradable above room temperature and its manufacturing method, and more particularly, to a tear leaf straw that integrates tea leaf powder into a tubular form, allowing it to retain the aroma of tea leaves without dissolving into the liquid.

BACKGROUND OF THE INVENTION

Straws are hollow tubes mainly used in beverages to facilitate consumption, enhancing user convenience. Most existing straws are made of plastic, which is difficult to decompose naturally. Improper disposal can lead to environmental pollution and pose risks to wildlife if ingested. In marine environments, plastics can bind with persistent organic pollutants like dioxins and PCBs, accumulating in organisms and transferring through the food chain, significantly impacting the health of both wildlife and humans. Although plastics can be recycled, the variety and difficulty in effectively sorting and cleaning them make recycling challenging, leading to high costs and inefficiencies in the recycling process. Consequently, some governments have proposed banning plastic straws entirely to mitigate environmental pollution and harm.

In response to policies limiting plastic use, industries have developed straws from various materials to reduce environmental impact. However, these alternatives still have some drawbacks:

1. Metal Straws: Producing metal straws generates a large amount of carbon dioxide, contributing to the greenhouse effect and raising environmental concerns. Additionally, metal straws are difficult to polish internally, making them prone to retaining impurities and challenging to clean, posing health risks with long-term use. Their rigid and non-elastic nature affects the mouthfeel, and the metallic taste can alter the beverage's flavor, which is a primary reason consumers avoid using them.
2. Glass Straws: Manufacturing glass straws requires high temperatures, resulting in significant carbon dioxide emissions. Glass straws are fragile and can break easily if mishandled during use or cleaning, potentially causing injuries. If unnoticed fragments remain, they can be ingested, posing severe health risks.
3. Paper Straws: Creating paper straws involves rolling, bonding, and waterproofing processes to achieve basic waterproof functionality for drinking. However, the adhesives and waterproofing agents used, such as edible glue or wax, can react with various beverages with differing pH levels, potentially releasing toxic substances. Even without toxicity, excessive consumption of these substances may pose health risks.

In order to address the shortcomings of these materials, recent efforts have focused on developing biodegradable materials that microorganisms in specific environments can quickly decompose. However, their higher manufacturing costs have limited widespread adoption and replacement of plastic straws in the food and beverage industry.

The present invention intends to provide a biodegradable tea leaf straw and a method for making the same to eliminate the shortcomings mentioned above.

SUMMARY OF THE INVENTION

The present invention relates to a biodegradable tea leaf straw, and comprises a tubular body made from a composite. The composite comprises tea leaf mixture: 35% to 65% in weight percentage, and biodegradable material: 35% to 65% in weight percentage. The tea leaf mixture contains 1% to 50% roasted tea leaf powder, and 50% to 99% inorganic filler powder. A particle size of the tea leaf powder is smaller than a particle size of the inorganic filler powder. The inorganic filler powder includes at least one of calcium carbonate, magnesium carbonate, kaolin, stearic acid, zinc stearate, zinc oxide, antimony trioxide, silicon dioxide, talcum powder, mica powder, barium sulfate, calcium silicate, or quartz powder. The biodegradable material includes at least one of polybutylene succinate (PBS), polybutylene succinate adipate (PBSA), polybutylene adipate terephthalate (PBAT), polyhydroxyalkanoates (PHA), starch-based plastics, polyvinyl alcohol (PVA), or polycaprolactone (PCL).

Preferably, the particle size of the tea leaf powder ranges from 0.1 to 1,000 μm.

Preferably, the particle size of the inorganic filler powder ranges from 0.01 to 100 μm.

The present invention also provides a method for manufacturing a biodegradable tea leaf straw, and the method comprises the steps of:

- roasting and sterilizing tea leaves, and grinding the tea leaves to form tea leaf powder;
- mechanically mixing the tea leaf powder with inorganic filler powder to form a tea leaf mixture, a particle size of the tea leaf powder being smaller than a particle size of the inorganic filler powder, the tea leaf mixture including 1% to 50% of the tea leaf powder and 50% to 99% of the inorganic filler powder, the inorganic filler powder including at least one of calcium carbonate, magnesium carbonate, kaolin, stearic acid, zinc stearate, zinc oxide, antimony trioxide, silicon dioxide, talcum powder, mica powder, barium sulfate, calcium silicate, or quartz powder;
- mixing the tea leaf mixture with a biodegradable material at a temperature between 140° C. to 170° C. to form a composite, the composite including 35% to 65% of the tea leaf mixture and 35% to 65% of the biodegradable material, the biodegradable material including at least one of polybutylene succinate (PBS), polybutylene succinate adipate (PBSA), polybutylene adipate terephthalate (PBAT), polyhydroxyalkanoates (PHA), starch-based plastics, polyvinyl alcohol (PVA), or polycaprolactone (PCL), and
- extruding the composite into a tubular form to create a straw.

Preferably, the particle size of the tea leaf powder ranges from 0.1 to 1,000 μm.

Preferably, the particle size of the inorganic filler powder ranges from 0.01 to 100 μm.

The present invention has the following advantages:

1. The present invention utilizes a specific material configuration where the tea leaf powder is roasted and sterilized to fully release its aroma. The tea leaf powder's particle size is smaller than that of the inorganic filler powder, ensuring the tea leaf powder adheres well to the inorganic filler powder. This adherence maintains the strength of the inorganic filler powder after forming, giving the tubular body a natural tea leaf aroma. When inserted into a liquid, the tea leaves do not dissolve, preserving the beverage's flavor. This makes the present invention practical and elegant due to its aroma. Additionally, the low manufacturing cost makes it attractive to consumers, helping reduce the use of plastic straws and contributing to plastic reduction and environmental protection goals.

2. All raw materials used in the manufacturing process of the present invention can be quickly decomposed by environmental microorganisms. When buried in typical room-temperature soil, the material decomposes in about six months, leaving only water, carbon dioxide, and inorganic filler powder. This ensures no environmental burden or harm, aiding in the reduction of plastic usage and pollution, thereby contributing to the health and safety of the environment and human health.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
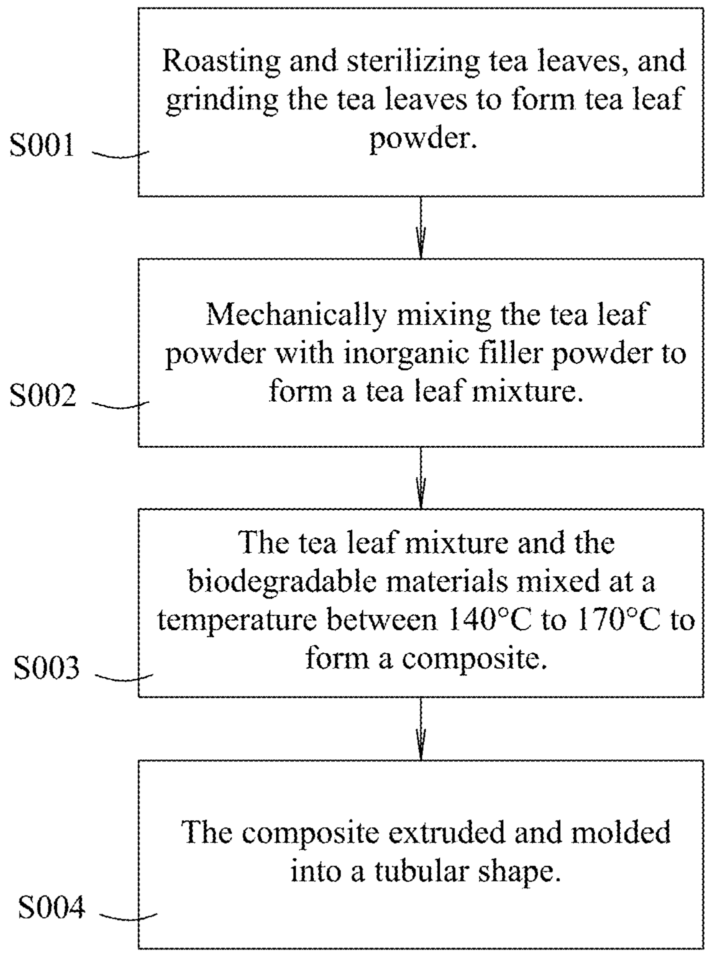
FIG. 1 is a flowchart of the manufacturing process of the method of the present invention.
Figure 2:
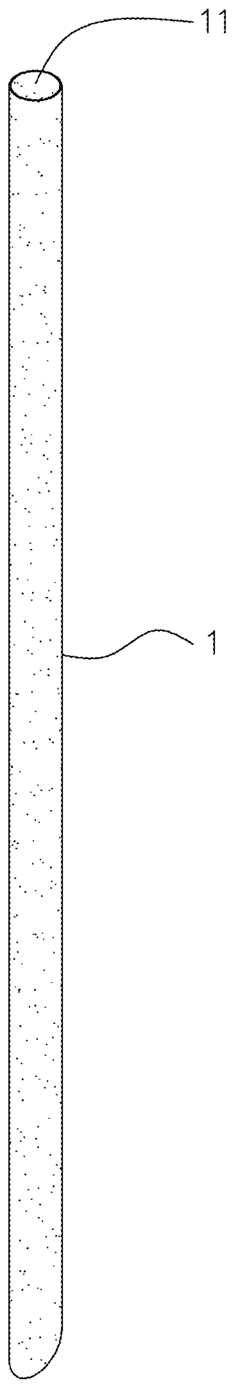
FIG. 2 is a perspective view of the tubular body produced by the method of the present invention.

Referring to FIGS. 1 and 2, the biodegradable tea leaf straw of the present invention comprises a tubular body made from a composite. The composite comprises tea leaf mixture: 35% to 65% in weight percentage and biodegradable material: 35% to 65% in weight percentage. The tea leaf mixture contains 1% to 50% roasted tea leaf powder, and 50% to 99% inorganic filler powder. A particle size of the tea leaf powder is smaller than a particle size of the inorganic filler powder.

The method for manufacturing a biodegradable tea leaf straw comprises the steps of:

S001: roasting and sterilizing tea leaves, and grinding the tea leaves to form tea leaf powder. The tea leaves are selected from various existing single or mixed types of tea leaves. These tea leaves can be either non-fermented or fermented to a certain degree. After selecting the desired tea leaves, they are roasted to release their aroma and then crushed and ground. The particle size of the tea leaf powder ranges from 0.1 to 1,000 μm.

S002: mechanically mixing the tea leaf powder with inorganic filler powder to form a tea leaf mixture. As for the inorganic filler powder, it is food-grade and can be selected based on the required resistance to different pH levels according to usage needs. In one embodiment, the inorganic filler powder includes at least one of calcium carbonate, magnesium carbonate, kaolin, stearic acid, zinc stearate, zinc oxide, antimony trioxide, silicon dioxide, talcum powder, mica powder, barium sulfate, calcium silicate, or quartz powder.

In order to ensure that the strength of the formed product is not compromised by the tea leaf powder and that the formed product retains the aroma of the tea leaves, the particle size of the tea leaf powder needs to be smaller than that of the inorganic filler powder. Preferably, the particle size of the inorganic filler powder ranges from 0.01 to 100 μm.

Regarding the ratio of tea leaf powder to inorganic filler powder, since tea leaves have a strong aroma, to ensure that the aroma of the final product is not too overpowering, the tea leaf powder can be added at a weight percentage of about 1% to 50%, and mixed with about 50% to 99% of inorganic filler powder to form the tea leaf mixture.

S003: in order to ensure that the tea leaf mixture can bind to a carrier, and in response to environmental requirements and goals, biodegradable materials are chosen as the carrier. Therefore, in the present invention, the tea leaf mixture and the biodegradable materials are mixed at a temperature between 140° C. to 170° C. to achieve binding and form a composite.

The biodegradable material includes at least one of polybutylene succinate (PBS), polybutylene succinate adipate (PBSA), polybutylene adipate terephthalate (PBAT), polyhydroxyalkanoates (PHA), starch-based plastics, polyvinyl alcohol (PVA), or polycaprolactone (PCL). The composite includes 35% to 65% of the tea leaf mixture and 35% to 65% of the biodegradable material.

S004: the composite obtained as described above is extruded and molded into a tubular shape body using an extruder. In this embodiment, the tubular shape body is made into a straw, wherein it includes a tubular body 1 with a passage 11.

After production, the tubular body 1 made of the present invention retains physical properties comparable to existing biodegradable material-made straws. Due to the particle size configuration, the inorganic filler powder effectively adheres and solidifies the tea leaf powder. Through the binding with biodegradable materials, the present invention maintains a certain level of strength overall. Additionally, the proportion of the inorganic filler powder not only enhances strength but also prevents the straw from becoming brittle due to environmental humidity or temperature changes, ensuring food safety during use without compromising chemical properties due to the addition of tea leaf powder.

Importantly, the present invention imparts the aroma of the tea leaves. In typical solutions (such as water or beverages), the attachment of tea leaf powder ensures that only the aroma of tea leaves is released without affecting the original taste of the solution. This enhances the added value of the tubular body 1, giving it a higher quality feel at a low manufacturing cost. Overall, these effects help attract consumer purchases, thereby reducing the use of plastic straws and contributing to plastic reduction and environmental protection goals.

Furthermore, all raw materials used in the manufacturing process of the present invention are materials that can be rapidly decomposed by environmental microorganisms. Therefore, they only require burial in normal ambient temperature soil for about six months to decompose. After decomposition, only water, carbon dioxide, and inorganic filler powder remain, completely avoiding any burden or harm to the environment. This assists in reducing plastic use, thereby lowering plastic pollution and maintaining the health and safety of environmental organisms and humans.

While we have shown and described the embodiment in accordance with the present invention, it should be clear to those skilled in the art that further embodiments may be made without departing from the scope of the present invention.

What is claimed is:

1. A method for manufacturing a biodegradable tea leaf straw, comprising the steps of:

roasting and sterilizing tea leaves, and grinding the tea leaves to form tea leaf powder;

mechanically mixing the tea leaf powder with inorganic filler powder to form a tea leaf mixture, a particle size of the tea leaf powder being smaller than a particle size of the inorganic filler powder, the tea leaf mixture including 1% to 50% of the tea leaf powder and 50% to 99% of the inorganic filler powder, the inorganic filler powder including at least one of calcium carbonate, magnesium carbonate, kaolin, stearic acid, zinc stearate, zinc oxide, antimony trioxide, silicon dioxide, talcum powder, mica powder, barium sulfate, calcium silicate, or quartz powder;

mixing the tea leaf mixture with a biodegradable material at a temperature between 140° C. to 170° C. to form a composite, the composite including 35% to 65% of the tea leaf mixture and 35% to 65% of the biodegradable material, the biodegradable material including at least one of polybutylene succinate (PBS), polybutylene succinate adipate (PBSA), polybutylene adipate terephthalate (PBAT), polyhydroxyalkanoates (PHA), starch-based plastics, polyvinyl alcohol (PVA), or polycaprolactone (PCL), and extruding the composite into a tubular form to create a straw.

2. The method for manufacturing a biodegradable tea leaf straw as claimed in claim 1, wherein the particle size of the tea leaf powder ranges from 0.1 to 1,000 μm.

3. The method for manufacturing a biodegradable tea leaf straw as claimed in claim 1, wherein the particle size of the inorganic filler powder ranges from 0.01 to 100 μm.

* * * * *